US012493908B1

United States Patent
Yotov et al.

(10) Patent No.: US 12,493,908 B1
(45) Date of Patent: Dec. 9, 2025

(54) SYSTEM AND METHOD FOR PRIVATE EQUITY DERIVATIVES CREATION AND USE WITH THE AID OF A DIGITAL COMPUTER

(71) Applicant: Cuneifin JSC, Sofia (BG)

(72) Inventors: Todor Yotkov Yotov, Sofia (BG); Boryana Svetlozarova Racheva-Iotova, Sofia (BG); Emil Emanuilov Margaritov, Plovdiv (BG); Petar Nikolaev Nikolov, Sandanski (BG)

(73) Assignee: Cuneifin JSC (BG)

( * ) Notice: Subject to any disclaimer, the term of this patent is extended or adjusted under 35 U.S.C. 154(b) by 0 days.

(21) Appl. No.: 18/732,103

(22) Filed: Jun. 3, 2024

Related U.S. Application Data

(63) Continuation-in-part of application No. 17/846,915, filed on Jun. 22, 2022, now Pat. No. 12,002,047.
(Continued)

(51) Int. Cl.
*G06Q 40/04* (2012.01)
*G06F 9/50* (2006.01)

(52) U.S. Cl.
CPC .............. *G06Q 40/04* (2013.01); *G06F 9/505* (2013.01)

(58) Field of Classification Search
CPC .................................. G06Q 40/04; G06F 9/505
See application file for complete search history.

(56) References Cited

U.S. PATENT DOCUMENTS

| 2017/0235537 A1 | 8/2017 | Liu et al. |
| 2021/0304310 A1* | 9/2021 | Markov ................. G06Q 40/06 |
| 2023/0091805 A1* | 3/2023 | Wolfberg ............... G06Q 40/06 |
| | | 705/35 |

FOREIGN PATENT DOCUMENTS

| WO | WO-0161538 A2 * | 8/2001 | ............. G06Q 40/06 |
| WO | WO-2015127019 A1 * | 8/2015 | ............. G06Q 40/06 |
| WO | WO-2018118990 A1 * | 6/2018 | ............. G06Q 40/06 |

OTHER PUBLICATIONS http://web.archive.org/web/20210518070405/htlps://en.wikipedia.org/wiki/Private_equity, cached on May 18, 2021.
(Continued)

*Primary Examiner* — Elda G Milef
(74) *Attorney, Agent, or Firm* — Leonid Kisselev

(57) ABSTRACT

The platform is provided with security, verifiability, and computational speed necessary to implement transactions involving derivatives of private equity assets. All relevant data necessary for the performance of the transactions is converted into machine-readable digital identities. References to location within the storages of the digital identities are included in a derivatives archetype associated with one derivative instrument. Price of the derivative instrument can similarly be determined using a pricing archetype that includes machine-readable references to the digital identities of data items as well as the formula necessary for the determination of the price. The processors in the platform can be combined to work in parallel in a variety of infrastructures. The methodology implemented by the platform allows to identify derivatives underlyings in the private market space, make projections for their potential future payments, dissect the types of risks associated with the potential future payments and offer various derivatives archetypes.

18 Claims, 9 Drawing Sheets

Related U.S. Application Data

(60) Provisional application No. 63/213,374, filed on Jun. 22, 2021.

(56) References Cited

OTHER PUBLICATIONS http://web.archive.org/web/20210621022953/htlps://en.wikipedia.org/wiki/Blockchain , cached on Jun. 21, 2021.
http://web.archive.org/web/20210615133154/htlps://en.wikipedia.org/wiki/Smart_contract, cached on Jun. 15, 2021.
http://web.archive.org/web/20210505205653/htlps://en.wikipedia.org/wiki/Cryptographic_primitive , cached on May 5, 2021.
Ang, Andrew and Chen, Bingxu and Goetzmann, William N. and Phalippou, Ludovic, Estimating Private Equity Returns from Limited Partner Cash Flows (Jun. 11, 2014). Columbia Business School Research Paper No. 13-83, available at https://papers.ssrn.com/sol3/papers.cfm?abstract_id=2356553.
Gupta, Arpit, and Stijn Van Nieuwerburgh. "Valuing private equity investments strip by strip." The Journal of Finance 76.6 (2021): 3255-330, available at https://papers.ssrn.com/sol3/papers.cfm?abstract_id=3466853.
Henry Lahr, Fat tails in private equity fund returns: The smooth double Pareto distribution; International Review of Financial Analysis 86 (2023) 102471, available at https://www.sciencedirect.com/science/article/pii/S1057521922004215.
Buchner, Axel, Christoph Kaserer, and Niklas Wagner. "Modeling the cash flow dynamics of private equity funds: Theory and empirical evidence." The journal of alternative investments 13.1 (2010): 41-54.
https://web.archive.org/web/20240421011839/https://en.m.wikipedia.org/wiki/Subnet, cached on Apr. 21, 2024.
https://web.archive.org/web/20240110075049/https://en.m.wikipedia.org/wiki/Distributed_networking, cached on Jan. 10, 2024.

\* cited by examiner

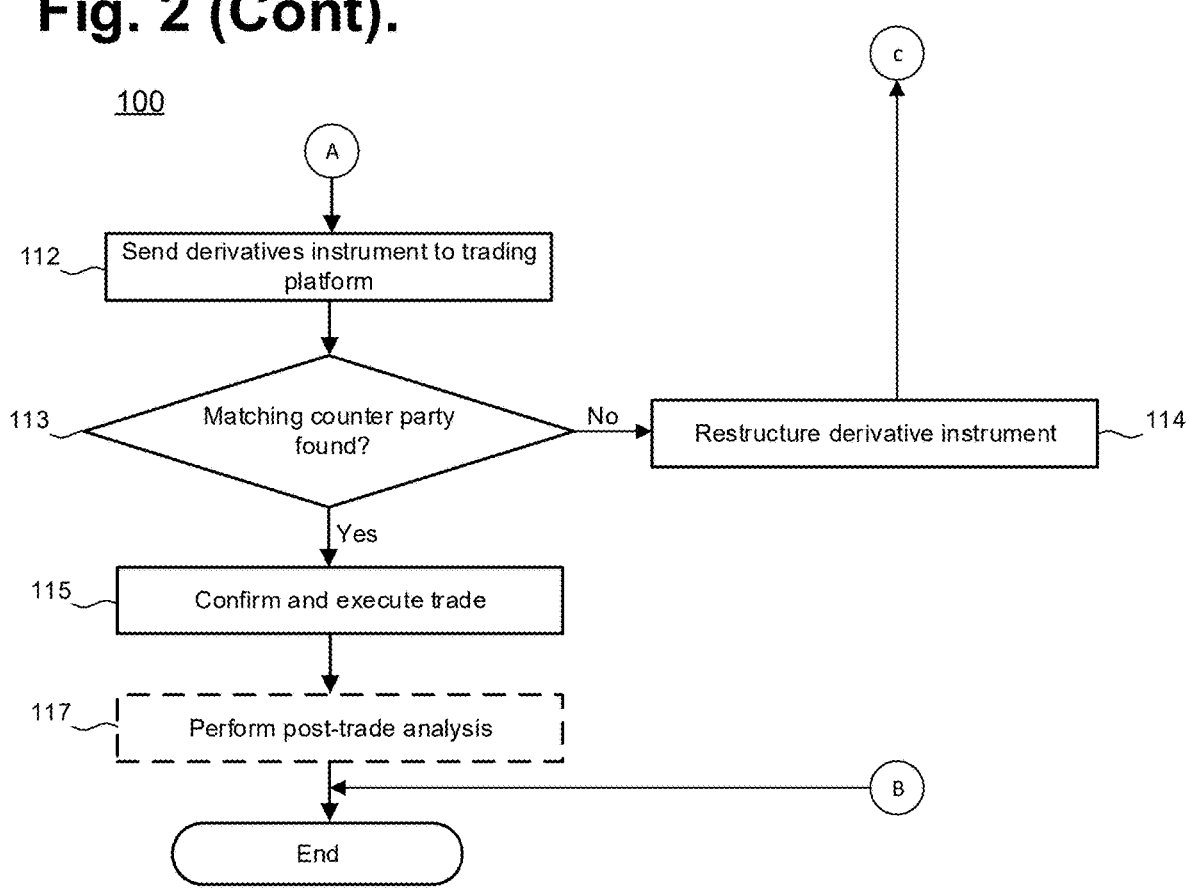

Fig. 6.

A. SPECIFICATION

| Exposure Type | Exposure Strength | Private Assets Type | | | | |
|---|---|---|---|---|---|---|
| Private Assets | Strong | VC | Buy Out | ... | | |
| | | Unconstraint | Unconstraint | | | |

| Exposure Type | Exposure Strength | Industry | | | | |
|---|---|---|---|---|---|---|
| | | Tech | Pharma | ... | | |
| Market | Neutral | Strong+ | Strong- | | | |

| Exposure Type | Exposure Strength | Region | | | |
|---|---|---|---|---|---|
| | | NA | Europe | ... | |
| | | Unconstraint | Unconstraint | | |

| Exposure Type | Exposure Strength | Industry | Region | ... |
|---|---|---|---|---|
| Market | Neutral | | | |
| Intr. Rate | Unconstraint | | | |
| Credit | Unconstraint | Pharma | NA | Europe |
| FX | Unconstraint | | | |
| ... | Unconstraint | | | |

| Payoff | | |
|---|---|---|
| Type | Option | |
| Number of Payments | 1 | |

B. UNDERLYING

| Underlying | Asset | Exposure |
|---|---|---|
| 1 | Prequin Private Equity Technology Index | 1 |
| | Prequin Private Equity Pharma Index | -1 |
| | MSCI Pharma | -0.5 |
| 2 | Prequin Private Equity Technology Index | 1 |
| | Prequin Private Equity Pharma Index | -1.3 |
| 3 | ... | ... |

Fig. 7.
21

A. SPECIFICATION

| Exposure Type | Exposure Strength | Private Assets Type | | | | Industry | | | | Region | | | |
|---|---|---|---|---|---|---|---|---|---|---|---|---|---|
| | | VC | Buy-Out | ... | | Tech | Pharma | ... | | NA | Europe | ... | |
| Private Assets | Strong | Unconstraint | Unconstraint | | | Strong+ | Strong+ | | | Strong+ | Neutral | Neutral | |
| | | Unconstraint | Unconstraint | | | Strong- | Neutral | | | Strong- | Neutral | Neutral | |

| Exposure Type | Exposure Strength | Industry | | | | Region | | | |
|---|---|---|---|---|---|---|---|---|---|
| | | Tech | Pharma | ... | | NA | Europe | ... | |
| Market | Neutral | Strong- | Strong- | | | Strong- | Neutral | Neutral | |

| Exposure Type | Exposure Strength |
|---|---|
| Market | Neutral |
| Intr. Rate | Neutral |
| Credit | Unconstraint |
| FX | Neutral |
| ... | Unconstraint |

| Payoff | Exposure Strength |
|---|---|
| Type | Forward |
| Number of Payments | 12 |
| ... | |

B. UNDERLYING

| Underlying | Asset | Exposure | | | |
|---|---|---|---|---|---|
| 1 | | | | | |
| 2 | | | | | |
| 3 | | | | | |
| ... | | | | | |

(A) STATISTICAL DESCRIPTOR

| Exposure Type | Exposure Strength | Private Assets Type | | Industry | | Region | | ... |
|---|---|---|---|---|---|---|---|---|
| Private Assets | Strong | V/C | Buy-Out | Tech | Pharma | NA | Europe | ... |
| | | Exposure 1.3 | 1.1 | 1 | 1.1 | 0.9 | 1.1 | ... |
| | | St Dev | | | | | | |

| Exposure Type | Exposure Strength | Industry | | Region | | ... |
|---|---|---|---|---|---|---|
| Market | Neutral | Tech | Pharma | NA | Europe | ... |

| Exposure Type | Exposure | St Dev | Delta | ... |
|---|---|---|---|---|
| Market | 0.1 | | | |
| Intr. Rate | 0.05 | | | |
| Credit | 0.3 | | | |
| FX | 0.1 | | | |
| ... | | | | |

| Payoff | | |
|---|---|---|
| | Exposure Strength | |
| Type | Option | |
| Number of Payments | 1 | |
| ... | | |

| Payoff | | |
|---|---|---|
| | Exposure Strength | |
| Type | Option | |
| Maturity | 1/1/2025 | |
| ... | | |

(B) UNDERLYING

| Underlying | Asset | Exposure |
|---|---|---|
| 1 | Prequin Private Equity Technology Index | 1 |
| | Prequin Private Equity Pharma Index | -1 |
| | MSCI Pharma | 0.5 |

SYSTEM AND METHOD FOR PRIVATE EQUITY DERIVATIVES CREATION AND USE WITH THE AID OF A DIGITAL COMPUTER

FIELD

This application relates in general to optimization of computational scalability and security, and, in particular, to a system and method for private equity derivatives creation and use with the aid of a digital computer.

BACKGROUND

Few industries could benefit as much from the use of up-to-date information, high data security, and transparency as private equity investment. Private equity investment refers to investments in assets that are not publicly traded and can include assets such as direct private equity investment, private equity fund, real estate investments or funds, infrastructure projects and alike illiquid, non-transparent investment opportunities. The private assets investment space is interesting to both individual and institutional investors, due to providing distinct risk-return characteristics not accessible via the public markets. However, generally, such investments are available only to entities with a high amount of available capital (generally for investors who are willing to commit as much as $25,000,000 or, even in the case with high net-worth individuals, for those with an "accredited investor" status) due to the large amount of due diligence that needs to take place before such investment takes place as well the complexity in estimating the values of the assets involved and the management of such transactions. Due to their complexity, such transactions further often lack transparency regarding risk-return characteristics. In particular, the risk-return profile of the private assets' investment opportunities is more complex than public asset, as in addition to the public assets characteristics driven by the market risk factors dynamics, the private assets also possess risks associated with specific premia spanning multiple categories. Such categories can include as illiquidity, capacity limitations, lack of transparency, business risks associated with the early stages of a company development that are not present in the public market domain as well as higher macro- and credit-risks, with private companies being generally more exposed to changes in the investment climate.

Some of the limitations of private equity investment, such as capacity, liquidity and flexibility of the exposure, could potentially be lowered by allowing investment on derivatives of the underlying private equity asset ("underlying" from here on), with derivatives (also referred to as "derivative instrument") being a financial instrument such as options, futures, and forwards that derive their value from the value of the underlying due to derivative instruments not necessarily providing direct exposure to the underlying, and not involving opening claims to the underlying. However, derivatives on private equity assets are not widely adopted, if at all, due to the complexities in pricing of the derivatives based on non-tradable assets and the inability to establish such a market within the traditional financial markets avenues which depend on liquidity of the underlying assets. Pricing difficulties are associated with the fact that the underlying is not tradable, there are large discontinuities in the price when corporate actions are observed. In addition, complexity, lack of transparency, and need to verify the identities of the parties involved in the transaction and provide segregated and dynamically vetted access to the derived data, analytics, values and trading instruments, pose sustainable challenges to the creation and adoption of a robust private equity derivatives framework.

The challenges associated with private assets investing are further exacerbated by the diversity of possible inventors whose needs are to be addressed. Investors typically have different investment needs, which vary based on their investment horizons and risk criteria. For example, some investors seek short-term exposure to private assets, while others aim to enhance their long-term positioning, the prior generally not feasible in the private markets space. Further, risk appetite also varies among investors. Some seek to avoid certain types of risks, depending on their existing portfolio, investment views, or both while others may accept those types of risks. Diversification is a common strategy where an investor aims to spread their investments to avoid overexposure to any single type of risk, whether that type of risk is a sector, region, market, or credit risk. In more sophisticated risk hedging strategies, an investor might purchase investments to hedge or counterbalance a particular type of risk they feel overexposed to. Currently such decomposition of private assets to different sources of risks represented as factors and ability to gain exposure with a specific desired profile in a flexible way is not possible unless accomplished via large and complex portfolios of both private and public assets which is accessible to only largest and most sophisticated institutional investors.

While computer-driven transactions have long-entered the financial world, no solution adequate for the challenges described above has yet been proposed. In particular, even if a satisfactory methodology for creating private asset derivatives existed, the computational loads to the pricing methodology within the timing, access provisioning and ongoing management and updating constraints could quickly exceed the ability of on-premises computer systems to handle as the number of derivatives that need to be processed rises due to the complexity and the number of factors that could affect the value of private equity investments. While cloud-based computer systems with distributed infrastructure do not have the same scalability issues as on-premises systems, the vastness of the data that can be stored in the cloud may in turn pose additional problems when applied indiscriminately to the purpose of the method of the present invention. In particular, a generic cloud infrastructure may not suit the needs of a large number of diverse investors that have both different goals and different starting points. For instance, different individuals, depending on their qualifications and net worth, may be entitled to access information regarding only certain types of private equity assets and their derivatives, and conventional cloud infrastructure may not be able to provide the necessary segregation and provisioning of data based on which private equity derivatives can be prepared and used.

Accordingly, there is a need for a computationally-scalable and secure way to identify derivatives underlyings in the private market space that are accessible to various types of investors, make projections for their potential future payments, dissect the types of risks associated with the potential future payments, and provide investors with the opportunity to swap such exposures or to gain exposure to any of those.

SUMMARY

The platform described below provides the security, verifiability, and computational speed necessary to implement transactions involving derivatives of private equity assets. All relevant data necessary for the performance of the transactions, including identifiers of parties who are allowed to participate in the transactions at any given time, are converted into machine-readable digital identities. References to location within the storages of the digital identities are included in a derivatives archetype associated with one or more derivative instruments, allowing to quickly locate all data necessary for transactions involving the derivative instruments. Price of the derivative instrument can similarly be determined using a pricing archetype that includes machine-readable references to the digital identities of data items as well as the formula necessary for the determination of the price, allowing to reference all necessary data within storage in a computationally-efficient manner. The processors in the platform can be combined to work in parallel in a variety of infrastructures, allowing to efficiently manage computational loads from a large number of complex private equity derivative instrument creation requests. The methodology implemented by the platform allows to identify derivatives underlyings in the private market space, make projections for their potential future payments, dissect the types of risks associated with the potential future payments and offer various derivatives archetypes, that can provide investors with the opportunity to swap such exposures or to gain exposure to any of those.

In one embodiment, a system for private equity derivatives creation and use with the aid of a digital computer is provided. The system includes a plurality of databases storing digital identities of items including a plurality of representations of private equity assets, a plurality of representations of public equity assets, and pricing archetypes, each digital identity includes at least two data arrays and metadata includes a connection between at least two of the arrays and machine-readable instructions for processing that digital identity, the plurality of databases further storing derivatives archetypes, each of the derivatives archetypes includes machine-readable references to locations of items includes: the digital identity for a derivative instrument associated with that derivatives archetype and the digital identity for one or more underlyings of the derivative instrument. The system further includes a plurality of processors including one or more central processing units (CPUs) and one or more graphics processing units (GPUs), the processors interfaced to plurality of databases and configured to perform using at least some of the digital identities steps of: receive from a user a request to create a private asset derivative instrument; receive from the user preferences for risk, return and exposure preferences; check whether one of the stored derivatives archetypes satisfies the received preferences; upon none of the stored derivatives archetypes satisfying the preferences, create the new derivatives archetype associated with the private asset derivative instrument based on the preferences, including associating one or more of the pricing archetypes with that new derivatives archetypes based on the user preferences; receiving from the user settings for the private asset derivative instrument associated with the new derivatives archetype and one or more desired characteristics for the private asset derivative instrument; and create the private asset derivative instrument using a portion of the new derivatives archetype, the pricing archetype associated with the new derivative archetype, the private asset derivative instrument user settings, and the one or more desired characteristics; and use the private asset derivative instrument for private equity asset portfolio management.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIGS. 6 and 7 are diagrams showing, for purposes of illustration and not limitation, two examples of a derivatives archetype as presented to a user.

FIG. 8 is a diagram, showing by way of illustration and not limitation, an example of a derivative instrument as presented to a user for confirmation.

DETAILED DESCRIPTION

Figure 1:
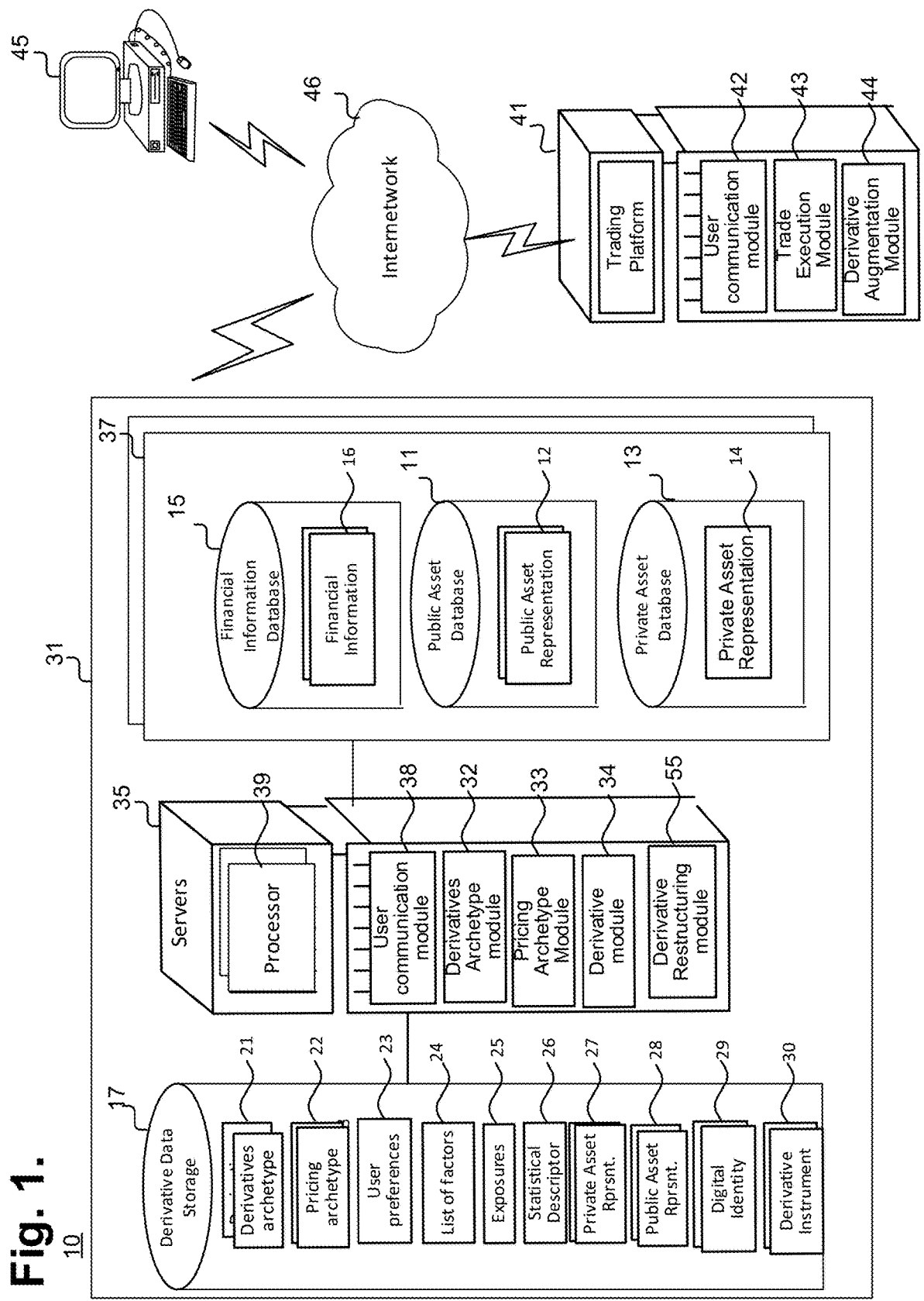
FIG. 1 is a block diagram showing a system for private equity derivatives creation and use with the aid of a digital computer in accordance with one embodiment.

In the global capital markets, various investment instruments have been created that provide investors with the ability to invest in instruments of varying investment horizons and gain exposure to different type of risk characteristics, while mitigating others. For example, in asset-swaps, investors can keep the credit exposure of holding a fixed income bond, but mitigate the market interest rate risk by swapping some fixed payments for floating payments based on predetermined benchmark. An equity swap can provide the ability for long-term investors to switch between stock market risk exposure and interest-rates risk on shorter horizons. Similarly Credit-Default swaps have been designed to transfer the credit exposure. Another large pool of derivatives types are the options, where the investor buying the option obtain the right but not the obligation to buy or sell a financial asset at a predetermined price in the future thus enabling investors to participate in gains or hedge risks. In all cases, a derivative (also referred to as a derivative instruments) has one or more underlying assets, which identifies the future payments that serve as a basis for the derivative outcome, and provides an objective methodology to measure the risk or set of different types of risks associated with the underlying future payments that allow establishing a pricing mechanism for the derivative product. More complex derivatives can further decompose the different types of risks of the underlying and offer structures that can replace one such risk with another. The system and method described provide a technical solution that allows to introduce private asset derivatives easily accessible, thus greatly enhancing the efficiency of the financial system, improving the set of the investment opportunities, and through that, advancing the set of the potential investment outcomes thus benefiting both the society and the investors on a stand-alone basis. FIG. 1 is a block diagram showing a system 10 for private equity derivatives creation and use with the aid of a digital computer in accordance with one embodiment. The system includes a platform 31 for private equity derivative creation and use. While the platform 31 shown with reference to FIG. 1 is a cloud-computing platform, in a further embodiment, the platform 31 can be implemented as an on-premises platform 31. In a still further embodiment, the platform 31 can be implemented as a hybrid platform that involves both localized components located in a particular locality and components located in a cloud-computing environment.

The platform 31 includes a plurality of data storages derivative data storage 17, databases 11, 13, 15, and one or more servers 35 interfaced to the data storage 11 and the databases 11, 13, and 15. The derivative data storage 17 can be a database that can store both encrypted and unencrypted data. The database 11 is a public asset database that stores representations 12 of multiple public assets. The public assets can be assets such as stocks, bonds, derivatives on public assets and indices, though other kinds of public assets are also possible. The representations 12 of the public assets can include one or more of ticker, Committee on Uniform Security Identification Procedure (CUSIP) number, name of the company associated with the public asset, pricing information of public asset, fundamentals of the stock, including but not limited to information on fundamental ratios (price to book ratio, price-to-earnings, earnings per share, debt-to-equity), though other representations 12 are also possible. The database 13 is a private asset database that stores representations 14 of one or more private assets. The private assets can be direct private equity investment, private equity fund or holdings, real estate investments or funds, infrastructure projects and alike illiquid, non-transparent investment opportunities, though other kinds of private assets are also possible. The representations 14 of the private assets can include one or more of name of the private asset or private asset fund associated with an asset, management company, vintage of when fund was initiated, information on return characteristics of the private asset or private asset fund, historical contribution and distribution of cash flows, though other kinds of representations 14 are also possible. The database 15 is a financial information database that stores financial information 16 such as macrofactors, interest rates, market information, and exchange rates, though other kinds of financial information 16 are also possible. While only one of each of the databases 11, 13, 15 are shown with reference to FIG. 1, the platform 31 could include multiple of such databases. In particular, the platform 31 could include multiple logical subdivisions 37 that each could have multiple databases 11, 13, 15 access to which requires the user on whose behalf the access is made to have certain credentials. For example, the parties associated with certain private assets can limit access to the representations 14 of those assets to only those users who are qualified by virtue of having undergone a specific know your customer (KYC) process or are already investors or qualified recipients of the data disclosures associated with the representations. Thus, depending on the user qualifications, (and consequently permissions) the databases 11, 13, 15 in one logical subdivision can be accessed by a certain user and derivatives can be created based on the data in that subdivision 37, but databases 11, 13, 15 can remain off-limits to that user. Such separation becomes essential when derivatives for different kinds of private assets and for users of different qualifications are created.

The servers 35 access the derivative data storage 17 and the databases when creating and analyzing the derivatives for private equity assets. Each of the servers can include one or more types of processors 39. For example, some servers can include one or more central processing units (CPUs), one or more graphics processing units (GPUs), and some include both CPUs and GPUs. Other types of processors 39 included in the servers are also possible. As further described below, the flexibility provided by the mixed clusters of CPUs and GPUs is essential to creation of private derivatives described below.

The derivative data storage 17 stores digital identities 29 of entities processed by the platform 31 during creation and analysis of private asset derivatives 30. The creation of digital identities is described in U.S. patent application Ser. No. 17/846,915, filed Jun. 22, 2022, to Todor Yotkov Yotov ("the Yotov Patent" below), the entire disclosure of which is hereby incorporated by reference. Other ways to create the digital identities 29 are also possible. The entities for whom the digital identities are created can include derivative instruments 30 (synthetic or standard, tokenized or non-tokenized), the underlyings of the derivative instrument, identification of parties interacting directly with the platform 31 (such as users on whose behalf a derivative instrument 30 is created), data items used by at least one pricing archetype module 26 executed by the one or more servers 35 and deployed for the pricing of the derivative instrument 30, private asset representations 14, public asset representations 12, financial information 16, derivatives archetypes 21, and other items stored in the derivative data storage 17. The digital identities 29 stored in the data storage 17 can be encrypted, such as using multi-primitive crypto mapping as described in the Yotov Patent cited supra. In a further embodiment, the platform 31 could also include a blockchain storage that could also store records regarding the data in the derivative data storage 17 as described in the Yotov Patent.

While the digital identities 29 can be of different types, the digital identities 29 all share the same structure and a minimum set of identical properties. In particular, each digital identity includes at least two arrays of data and metadata. The metadata includes information how each array is related to another array. For example, if one array includes primary identifiers (identifiers of a type of information, such as a identifying a price of a particular resource at a given point of time), the other array can include the value for said identifiers such as a digit representing the price of that particular resource at the given point of time. The metadata in that digital identity includes machine-readable information of how the arrays are connected to each other (such as which value in one array corresponds to the type of value in another array) and also about the formats of different data pieces in the array (for example, such format can be true/false, integer, how many characters are there, and logical state). The metadata further includes machine-readable instructions (with the term machine-readable as used within this application meaning including preset conventions for data integrity, data connectivity, allowed interfaces and mapping procedures, and triggers thereto) of how the digital identity 29 is to be used. Such instructions can include an identification code of the digital identity 29, which identifies the type of the digital identity 29, time period when digital identity 29 is created, and the interfaces and procedures enabling the digital identity 29 to be recognized and managed as a data unit by the servers 35. As the identification code can be used to quickly identify information about a particular digital identity 20, the code can be used for grouping together identities 20 with similar traits during search and analysis. In a further embodiment, if the derivative data storage 17 is operated via database management system, the digital identities could not include metadata and instructions for what actions to perform on the digital identities would be included in the computer readable code implemented by the servers 35.

As a result of including machine-readable instructions for utilization of a digital identity 20, the metadata for a digital identity of a derivative instrument can specify that the digital identity needs to be included in a particular portion of a derivatives archetype 21 (described further below). The machine-readable instructions in the metadata can further include instructions for creating at least some of the values included in the digital identity 29, such as mathematical formulas used to generate some values for an array within that identity. Digital identity templates from which the digital identities are created as described in Yotov Patent cited supra include the same information as digital identities except that the array where values for the types of information described in the other array are not filled out and portions of the metadata referencing to when the digital identity is created are also blank. In addition, the digital identity templates include the mapping information for the relevant subset of the taxonomy governing all the data items in accordance with the data structure as described in the Yotov Patent cited supra. Thus, digital identity templates that will be used for creation of digital identities of different types will have different metadata as well as different primary identifiers. Other ways to create the digital identities are also possible.

The digital identities 29 provide a machine-readable data object that can be interpreted by the servers 35 in a computationally-efficient manner. To further increase the computational speed, modeling and deployment flexibility, and ease of access of data included as part of the digital identities 29 without decreasing their security, the derivatives archetype module 32 implemented by one or more servers 35 creates one or more derivatives archetypes 21 using one or more derivatives archetype templates, though other ways to create the derivatives archetypes 21 are possible. Each derivatives archetype 21 has a unique identifier and includes a machine-readable reference to one or more locations of the digital identity 29 for a derivative instrument 30, a machine-readable reference to one or more locations of the digital identity 29 for the underlying of the derivative instrument, a machine-readable reference to one or more locations of digital identities 29 of data items in accordance with the data structure used within the derivatives archetype, a machine-readable reference to one or more locations of data items in accordance with the data structure used by at least one pricing archetype module 33 deployed for the pricing of the derivative instrument 30, machine-readable reference to one or more locations of the digital identities 29 of parties that have the rights to access the information related to the underlying, and machine-readable reference to a location of a pricing archetype 22 used in the derivatives archetype.

The derivative data base 11 stores a plurality of pricing archetypes 22 that can be referenced in the derivatives archetype 21. The pricing archetypes 22 could be preexisting or created specifically for that derivatives archetype 21. For example, if all of the existing pricing archetypes 22 stored on the platform 31 are for an private-to-public asset swaps or options, but the derivative instrument 30 referenced in the derivatives archetype 22 is a private-to-private swap or option, a new pricing archetype would be created to be referenced in the derivatives archetype 21 referencing the digital identity 29 for that private-to-private swap or option. The pricing archetype module 33 creates the pricing archetype 22 that is referenced within the derivatives archetype 21 using one of the pricing archetype templates as described in the Yotov Patent cited supra, though other ways to create the pricing archetypes 22 are also possible. Each pricing archetype 22 includes a formula for estimating price of the derivative instrument, one or more fixed elements of the formula (such as values for particular coefficients used within the formula), and machine-readable reference to one or more locations of the digital identities 29 of the data elements, or to locations of data items in accordance with the data structure. Both the pricing archetype 22 and the derivatives archetype 21 can be encrypted. The pricing archetype template includes all information as the resulting pricing archetype except for the machine-readable references to the location of the digital identities 29, and also portions of the metadata when a pricing archetype is created are also blank.

The creation of the derivatives archetypes 21 and the corresponding derivatives instruments is done by one or more of the servers 35 based communications with users received via one or more computing devices 45 provided to the platform 31 via an Internetwork 46 (such as the Internet or a cellular network, though other kinds of internetworks 46 are also possible) by user communication module 38 implemented by one or more of the servers 35. While the user computing device 45 is shown as a desktop computer 45 in FIG. 1, other types of user computing devices 45, such as tablets, laptops, and smartphones, are also possible. The user communication module 35 can communicate with the user computer device 45 in a variety of ways. For example, the user communication module 35 can enable exchange of web pages with the user computing device 45 and the providing of a Graphical User Interface (GUI) to the user computing device 45. In one embodiment, when a user requests that a web page be displayed by a web client (typically referred to as a "web browser", while those skilled in the art can recognize that the delivery in a programmatic or a console mode can also emulate in different ways the form and the user experience of a web delivery), the web browser transmits a request, defined according to a computer-manageable transfer protocol such as HTTP, TCP/IP, TELNET or similar, for the web page to the web server that hosts the web page. In response to the request, the web server transmits the requested web page to the requesting web browser in a response message that is also defined according to the transfer protocol. In this embodiment, the user computing device 45 may or may not make direct calls or contact the user communication module 38—but in any case, they interact via the GUI. Other ways for the user communication module 38 to interact with the computing device 45 are also possible such as voice-recognition devices, APIs or other machine-readable instructions devices. For example, separate hardware configurations for separate users requiring partitioned or non-shared clusters, partitioned or non-shared databases, partitioned or non-shared web servers, or a combination of all three partitioned or non-shared elements can be readily implemented. In such embodiments, user devices 45 will customarily make direct calls to the user communication module 38. In a further embodiment, the communication between the user communication module 38 and the user computer device 45 can be executed via programmable APIs, which are in conformity with communication protocols pre-programmed on one or more of the servers 35 implementing the user communication module 32, as well as data formats including block, packet and stream exchange formats, among others, specifics on the input and output parameters, system and network settings, metadata, integrity management processes and procedures, and cybersecurity protocols and processes, as well as other settings implemented on the servers 35 implementing the user communication module 38. In a still further embodiment, the communication between the user communication module 38 and the user computing devices 45, the trading platforms or other participating agents can be executed via other types of pre-defined procedures for Input/Output and communication without GUI or API, such as AI agents, EDI, packaged runtime and query language access procedures, subject to the format and synchronization and integrity management properties matching those pre-defined from the side of the user communication module 38 as allowed at the time of executing the operation.

The initial communication that starts a creation of a derivative archetype and the corresponding derivative instrument is a user request to create a derivative instrument with specific risk, return, exposure characteristics for the derivative to be created, such as the magnitude of exposures to market risk, sector risk, regional exposures, credit risk and is received by a user communication module 38 implemented by one or more of the servers 35. A user can be a person or a platform or another software. Upon receiving the request, the servers 35 check if there is an existing derivative archetype 21 that can be associated with the requested derivative instrument. The received preferences are stored in the derivative data storage 17. If no matching derivative archetype 21 already exists, the derivative archetype module 32 begins a process of creating a derivative archetype 21 and sends to the pricing archetype module 33 the necessary information such as risk, return, and exposure characteristics. Upon receipt of the preferences 23, the pricing archetype module either identifies an existing list of factors 24 associated with the representations 14 of the private assets stored in the database 13 to which the request relates or creates the list of the factors for all of the representations 14 of the private assets to which the request relates. The list of factors 24 can be created by the pricing archetype module 33 by applying a machine-implemented quantitative model (which can be stored in the derivative data storage 17) over the representations 14 of the private assets or representation 12 of the public assets or both. The factors 24 can include categorical factors based on descriptive characteristics of the representations 14 of the private assets to which the request relates, such as types of fund associated with the private asset (such as a venture capital fund or a buyout fund), sector of the private asset in question, and geographical region relating to the private assets, though other kinds of categorical factors are also possible. Alternatively, the factors 24 can represent sensitivity to at least one of variables describing macro-characteristics and market characteristics. For example, factors that relate to macro-regimes can include factors such as inflation and credit strength though other factors are also possible. The factors 24 that represent sensitivity to market regimes could include implied volatility, levels of interest rates, and levels of major market indices, though other kinds of factors that represent sensitivity to market regimes are also possible. In a still further embodiment, the factors 24 can be extracted based on market data and represent functions of market indices, public market proxies, macro-factors, derived market data such as implied volatility, implied dividends well as macro-factors GDP, unemployment, etc., Still other factors 24 are possible. In a still further embodiment, the factors 24 can be extracted based on fundamentals of both private and public equity data. In a still further embodiment, the factors 24 can represent an idiosyncratic private markets behavior component which is extracted based applying a quantitative model having private assets characteristics as the dependent variables and public assets characteristics as explanatory variables or features.

The use of the factors 24 increases the transparency of the characteristics of the derivative instrument underlying and thus the creation of the derivative instrument and the pricing archetype module 33 can apply a wide variety of quantitative models for obtaining the factors 24. For example, such quantitative model can be a regression model, such as one or more of a panel regression model, a time series regression model, and a cross-sectional regression model. For example, when creating the factors 24 based on fundamental characteristics of the representations 14 of the private assets a panel regression or a cross-sectional regression could be used where the dependent variable could be any performance characteristic of the private assets such as Cash flows realized in a given period of time, IRR, TWR and explanatory variables are selected fundamental characteristics of the private assets such as industry, size, leverage, earnings, valuation. Those characteristics could be based on individual private equities or aggregated to a fund level based on holdings. Other quantitative models could include standard regression techniques, robust regression, as well as more advanced machine learning techniques, such as linear or non-linear regressions such as: Lasso, Polynomial, Ridge (Bayesian and Kernel), Gaussian, Elastic Net, Support Vector, Decision tree-based (Decision trees, Random forest, Gradient boosted, Adaptive boosted), Artificial Neural Networks, and Genetic algorithms. Furthermore the platform 31 could apply an optimization algorithm that finds the machine-learning model with the minimum number of features to decrease complexity and increase robustness and applies this model to the factors creation.

Once the list of factors 24 is extracted or identified, the pricing archetype module 33 further identifies those of the factors 24 on the list that are relevant to the user preferences 23. In one embodiment, the identification could be performed by applying predetermined matching criteria between the user preferences 23 and the factors 24 on the list. For example, if the user preferences 23 state that the user would like the low exposure to particular risks, the identification could involve selecting those factors 24 that are most associated with these types of risks based on rules regarding the nature of the factors or the process of their creation and then in steps that follow to select private assets least associated with these selected factors 24 being preferable for derivative creation for this user. In the opposite example, if the user wants highest exposure to particular risks, the factors 24 most associated with risk would be identified for use in creation of the derivative instrument 30 based on private assets most associated with those factors 24. If the user has neutral preferences related to certain types of risks the system will not select factors having high association with those risks and low associations with risks towards which the user has high or low exposure preferences. Alternatively, identifying the factors 24 can be framed as an optimization model. Since the individual selection or combination of factors might have a significant impact on optimization model performance, an important step in the process will be the feature engineering (sub) process, which is going to create and select the most appropriate factors 24. Model parameters are external to the model, cannot 'be learned' from the data, and are crucial to the model performance. Optimization algorithms (machine-learning-based algorithms such as genetic algorithms, brute-force, heuristic-based) might be applied to find the best set of factors, model parameters, and select the best model to use. The optimization problem can be defined in various ways depending on the objective, user input and constraint definitions.

In addition to identifying the relevant factors 24, the pricing archetype module 33 further identifies the exposures of at least some of the private assets represented in the database 13 and at least some of the public assets represented in the database 11. Identifying exposures 25 can similarly be performed by applying a machine-implementable quantitative model on desired characteristics of the private assets and public assets represented in the databases 13 and 11 respectively. The calculation of exposures could be optional if the public and private assets used for creation and selection of the relevant factors are the same as when identifying the relevant factors 24 described above and the estimation technique is also the same between the two steps. If regression is used, the dependent variable could be cash-flows realized in a given period of time, IRR, TWR. The regression could be a standard regression, robust regression, ridge regression, or more advanced techniques such as Lasso, ML-based ElasticNet or Bayesian-type regression techniques. Non-linear techniques can also be used such as Kernel-Ridge regression, polynomial regression, as well as suitably selected Neural Network techniques. Other types of quantitative models could also be used.

The pricing archetype module 33 further converts the user preferences 23 based on the identified factors 24 and the exposures 25 to a statistical descriptor 26. The statistical descriptor 26 quantifies the relationship between the user preferences 23 and the exposures 25 and factors 24. In particular, the pricing archetype module 33 can construct an empirical distribution of the exposures 25 towards each of the factors 24, each one of which represents different type of risk. In one embodiment, the pricing archetype module 33 defines what high positive, high negative or "neutral" exposure means in statistical terms based on buckets of multiples of standard deviation or other dispersion measure. The statistical descriptor 26 describes the cut off standard deviation from the mean (or another dispersion, such as a particular quantile) that satisfies the user preferences. In a further embodiment, the statistical descriptor 26 could be defined through sample quantiles. For example, if the user preferences specify that the user wants low exposure to particular factors, the statistical descriptor 26 specifies what quantile of the exposures distribution is consistent with the low exposure specified in user preference 23. Those skilled in the art would recognize that other rule based on statistical methods could be applied to generate the statistical descriptor.

The pricing archetype module 33 further selects one or more of the representations 14 of the private assets as private market representatives and optionally one or more of the representations 12 of the public assets as the public market representatives using the empirical distribution generated during creation of the statistical descriptor 26. In one embodiment, the empirical distribution of the exposures associated with the private market representations 14 and the public market representations 12 towards factors 24 is divided into quantiles for each of the identified factors 24 and the system selects those of the private market representations 14 and the public market representations 12 that have exposures that are in the highest, lowest, and middle quantiles for each of the selected factors 24 as the private market representatives and the private asset representatives respectively depending on the user preferences.

The pricing archetype module 33 further uses the public market representatives, the private market representatives, and the statistical descriptor to find functions associated with the private market representatives and the public market representatives that match the statistical descriptor in a satisfactory way. In particular, the functions can be found using pre-defined rules or using statistical or optimization procedures. One possible implementation of a rules-based approach could be dividing exposures set into deciles (or other quantiles) for each of the factors and selecting representatives that have highest participation across all factors in the upper decile, lowest decile and the middle deciles for the high positive and negative and low exposures respectively. The function can be an identity function for each of the selected public market representatives and private market representatives or a linear combination selected in such a way to make the weighted exposures matching the statistical descriptors. Thus, in one embodiment, the functions can be the identities of the private market representatives and the public market representatives.

One possible implementation of an optimization technique could be a method optimizing an objective function subject to constraints so that to mimic the statistical descriptor as close as possible. Constraints could be exposure constraints as per the user Risk-Return-Exposure preferences, constraints on the risk measured by any risk or volatility measure coming from any of the factors, constraints on sensitivities towards any of the factors. The optimization is run to find the weights across investable assets or market indices representing the public and private market representatives, as well as potential hedging positions so that the objective function maximizes return, or maximizes net cash-flows or minimize risk which can be measured by any dispersion risk measure, tail-risk measures or measures associated with drawdowns to achieve any suitable investment profile. The function of the private and public market representatives is then constructed based on the optimal solution of the optimization process, with the weights coming out of the objective function of the optimization problem being the weights of the public market representatives and the private market representatives and the function of those weights will be a linear function. As multiple optimization problems can be solved, multiple functions of the private and public market representatives can result. Other embodiments of objective functions are also possible.

One or more of the servers 35 further implement a derivative archetype module 32 that set the functions of the public market representatives and of the private market representatives as underlyings of the new derivative archetype 21, thus creating the new derivative archetype 21 that still needs a pricing archetype assigned before being usable. The setting of the underlying of the derivative archetype 21 allows to create the derivative instrument. In particular, the derivative instrument 30 must include the definition of the derivative instrument (such as what is the underlying are, what is the payoff structure, and what is the maturity, though other characteristics defining the derivative instrument 30 are also possible), the statistical descriptor 26 and the price of the derivative instrument 30 that is calculated as described below. Some of the contents of the derivative instrument can be grouped together as a derivative descriptor, which can include the price, the payoff structure, and sensitivity to one or more factors 24. The derivative archetype 21 can include more underlyings that are included in the derivative instrument which are all corresponding to the statistical descriptor 30. Before proceeding to further steps of creating the derivative instrument, the user communication module 38 presents to the user via the user computing device 45 the created derivative archetypes, and requests the user to select one of the underlyings in the derivatives archetype 21 for the creation of the derivative instrument 30 as well as provide other characteristics of the derivative instrument, such as the payoff structure. FIGS. 6 and 7 are diagrams showing, for purposes of illustration and not limitation, two examples of a derivatives archetype 21 as presented to a user. Alternatively the best underlying can be selected via a quantitative or rules-based procedure. Rules could be selecting the underlying with the highest AUM, better data transparency, track-record of success of the management company, though other embodiments are possible too. Similar inputs can be used in a quantitative approach.

The selected underlying is then used to project cash flows for the derivative instrument 30. In particular, the derivative archetype module 32 projects the future cash flows of the underlying selected for the derivative instrument 30 and a pricing archetype is used to price that derivative based on the projected cash flows. While the derivative data storage 17 can include multiple pricing archetypes, the pricing archetype that is selected for pricing a particular derivative instrument 30 is one that most closely correlates to the nature of the derivative instrument 30. For example, it can be cash-flows discounting model if the derivative is a linear one such as swap or forward. Various techniques could be used for generation of the cash flows. In one embodiment the cash flows are historically observed cash-flows by the private assets matching a sub-set of the characteristics of the private assets set as the underlying in the derivative archetype 22. In another embodiment the cash-flow projection method can utilize a deterministic model based on parameters calculated using historical cash flow data. In yet another embodiment the cash flow projection can utilize a stochastic model based on Brownian motion. In yet another embodiment, the cash flow could be projected by utilizing a stochastic model based on Levy processes. The latter two embodiments require the derivative archetype module 32 to include a machine module for random number generation.

If a stochastic model based on Levy processes is used for cash flow projection, the stochastic model can be any stochastic model, including the model described by Buchner et al. in. Buchner, Axel, Christoph Kaserer, and Niklas Wagner. "Modeling the cash flow dynamics of private equity funds: Theory and empirical evidence." The journal of alternative investments 13.1 (2010): 41-54, the disclosure of which is incorporated by reference, to incorporate a Levy process instead of the typically used Brownian motion used in Buchner et al., In this embodiment, the derivative archetypes module 32 assumes that the cash-flows at time t follow a process of the type:

$$d \ln p_t = \mu_t dt + \sigma_P dY_{P,t} \quad (1),$$

where $\mu_t$ is time-dependent drift, $\sigma_P$—constant, $Y_{P,t}$—Levy-Process.

$$p_t = p_s \exp[\int_s^t \mu_u du + \sigma_P(Y_{P,t} - Y_{P,s})], \quad (2)$$

$E_s[p_t] = p_s \exp[\int_s^t \mu_u du] E_s[\exp(\sigma_P(Y_{P,t} - Y_{P,s}))]$ (3), where the Expectation term is the Characteristics function of the Levy-process increments. The derivatives archetype module 32 then finds (3) based on the Characteristic function in equation (3).

The drift $\mu_t$ is defined based on equating (3) with the expected instantaneous capital distribution $$E_s[p_t] = \left(\frac{dM_t^s}{dt}\right)C, \quad (4)$$

where $$M_t = \frac{P_t}{C}$$

is the cumulated capital distribution scaled by C—committed capital, $M_t$ converges to a long-term mean m, $M_t^s = E_s^P[M_t]$—the conditional expectation under a Probability Measure P of $M_t$ at time $s \leq t$, $dM_t^s = a_t(m - M_t^s)$ dt, (5), $$M_t^s = m - (m - M_s)\exp\left[-\frac{1}{2}a(t^2 - s^2)\right],$$

(6) and the condition $p_t = (dM_t/d_t)C$ (7).

The derivatives archetype module 32 then generates distribution cash-flows based on a random number simulator to simulate the stochastic process increments $Y_{P,t} - Y_{P,s}$ and equation (2).

In a further embodiment when the cash flow projection uses a stochastic model based on Levy processes is an extension of the Buchner et al. model which incorporates a process to randomize the model volatility. One such possible embodiment can be based on NIG-Levy model, though other models can also be used. Specifically, in the Bucher et al model for the cash-flows specified in (10)

$$p_s = at(mC - P_s)\exp\left[-\frac{1}{2}[a(t^2 - s^2) + \sigma_P^2(t - s)] + \sigma_P \in_t \sqrt{t - s}\right],$$

where $\in_t \sim \mathcal{N}(0, 1)$, (10), the derivatives archetype module 32 includes a module that randomizes the $\sigma_P$ by modeling $\sigma_P^2$ as an Inverse Gaussian random variable:

$\sigma_P^2 := I_P$, where $I_P \sim IG(1, \vartheta)$, where $\vartheta$—estimated from the data.

Then $\left[-\frac{1}{2}\sigma_P^2(t - s) + \sigma_P \in_t \sqrt{t - s}\right] =$ (11)

$\left[-\frac{1}{2}I_P(t - s) + \sqrt{I_P} \in_t \sqrt{t - s}\right]$ is $NIG\left(\sqrt{\frac{\vartheta^2}{t - s} + \beta^2}, -\frac{1}{2}, \sqrt{t - s}, 0\right)$ Thus:

$$p_s = at(mC - P_s)\exp\left[-\frac{1}{2}[a(t^2 - s^2)]\right]\exp[I_P] \quad (12)$$

The derivatives archetype module 32 then generates distribution cash-flows based on a random number simulator to simulate the stochastic process increments $Y_{P,t} - Y_{P,s}$ and equation (12).

The parameters of the model can be fit based on historical data or provided by a user.

Those skilled in the art will recognize that other Levy processes can similarly be employed with or without mean-reversion. Under such embodiments, the system employs a machine-based random number generation used while generating the private assets distributions cash-flows under equations (2) and (12).

The derivatives archetype module 32 uses the cash flow projection together with one or more pricing archetypes 23 to price the derivative instrument 30 referenced by the derivative archetype. The pricing of the derivative instrument 30 could be based on any pricing model consistent with the projected cash flows. Upon the completion of the pricing of the derivative instrument 30, the derivative instrument is provided by the user communication module 38 to the computing device 45 of the user for confirmation that the created derivative instrument satisfies the user whose request originated the creation of the derivative instrument. FIG. 8 is a diagram, showing by way of illustration and not limitation, an example of a derivative instrument 30 as presented to a user for confirmation. If the derivative instrument satisfies the user, the user can set the derivative instrument 30 to be sent for trading to a trading platform.

The trading platform 46 is connected to the platform 31 via the Internetwork 41. The communication between the trading platform 46 and the platform and the user computing device can be implemented in the same ways as described above with regards to the communication between the platform 31 (and the user communication module 38 in particular) and the user computing device 45. While the trading platform 46 is shown only as a server (which includes one or more processors such as CPUs or GPUs), the trading platform 46 can include multiple servers as well as databases and other components necessary for execution of the modules described below. The one or more servers of the trading platform 46 execute a plurality of modules. One of the modules executed by the servers of the trading platform 46 is a user communication module 42 that can receive commands from the user via the user communication device 45 and provide information to the user via the user communication device 45. Another module executed by the servers of the trading platform 46 is a trade execution module 43, which lists the received private assets derivative instrument on an order book and executes the trades on the derivative instrument 30 with parties looking for derivative instruments with the same characteristics as the derivative instrument 30.

Further, the trading platform 46 servers execute a derivative augmentation module 44 that upon the trade execution module 43 failing to execute trades on the derivative instrument 30 module (either within a predetermined amount of time or upon the user who requested the trading on the derivative instrument determining that too much time has passed) communicates with a derivative restructuring module 55 executed by the servers 35 of the platform to create additional derivative instruments 30 whose characteristics will differ from the derivative instrument 30 which has not been traded. In such circumstances, the derivative augmentation module provides to the derivative restructuring module desired exposures of multiple users who are also using the trading platform 46 and the derivative restructuring module restructures the derivative instrument 30 that failed to trade based on these desired exposures. Thus, the derivative augmentation module 44 and the derivative restructuring module 55 find optimal matches between the desired exposures of multiple users thus creating a multi-party deals proposals, by potentially structuring additional derivative instruments 30 to have close approximation of the exposures desired by the active users. The module 55 restructures the listed derivative instrument 30 into underlying factors and structures them back into a multi-party instrument. Thus, the platform 31, through the trading platform 46, uses the derivative instrument 30 for private equity asset portfolio management.

The creation of the private equity derivative instrument as described above is a computationally intensive and a single processor 39 may not be able to perform the necessary calculations in a satisfactory time, especially as the number of users utilizing the platform 31 grows. Each of the processors 39 executes code stored in the computer readable storage medium interfaced to that processor 39, with the connection between the processor and the computer readable storage medium capable of including a computer bus, a wired connection, electromagnetic carrier waves, an optical connection or a combination thereof. In the context of pricing and structuring of derivatives instruments thereto, parallel processing performed by at least some of the processors is particularly indispensable to the servicing of distributed data infrastructure and multilayered provisioned data access described below. As mentioned above, at least some of the servers 35 include clusters of CPUs and GPU for the most computationally intensive operations performed by the platform such as the triggering, execution, storage, reporting and management of statistical, pricing or machine learning methods and neural networks, including logic decision trees, confidence assessments, Generalized Ridge Type estimators, ARIMA models, models with lagged variables, or other suitable techniques, including Lasso, Polynomial, Ridge (Bayesian and Kernel), Gaussian, Elastic Net, Random forest, Boosted Regression Trees, Ensemble, gradient boosting, support vector machine, support vector classification, support vector regression, among others, and other linear or non-linear including supervised or unsupervised machine learning models applicable to the computer operation performed. Critical in the context of creation, pricing and trading of private equity derivative instruments including in the asset class-specific distributed data infrastructure and multilayered provisioned data access environment, CPU and a GPU collaborate to boost data throughput and the number of concurrent calculations within an application. In one embodiment, GPUs can be used to speed up calculations where the quantities of data per a certain calculation or a set of parallel or consequent calculations exceeds a pre-programmed data load threshold. The deployed GPUs shall thus complement CPUs by allowing repetitive computations inside an application or a process triggered by a programmable computer code to perform in parallel. At the same time, the systemic processes and programs serving the primary functions of the system continue to run on the CPUs. One or more of the CPUs serve as the platform's 31 taskmaster, coordinating various general-purpose computing operations pertinent to the embodiment, while the GPUs performs a smaller range of specialized duties (most often mathematical). Additionally, the flexibility of a mixed-hardware cluster structure enables additional optimization in memory that could further increase speeds and deployment and scalability flexibility and dimensionality, while maintaining the uniform procedures and workflows for integrity management, information and network security, third-party connectivity and data life-cycle management up and through the execution of the pre-defined data disposal routines.

Further, as mentioned above, the platform 31 could be implemented on-premises, in a cloud-computing environment, or as a hybrid solution. Thus, in the hybrid implementation, if the processors 39 present in an on-premises solution are not able to handle the computational load from requested calculations within a satisfactory amount of time, the on-premises servers 35 communicate via the Internetwork 46 with servers 35 within a cloud-computing environment to offload some of the computations to the servers 35 within the cloud-computing environment. Thus, the servers 35 (and the databases to which they are interfaced) in the platform 31 could be located at different physical locations, both due to differences between location of the on-premises servers 35 and those in the cloud-computing environment, as well as possible differences in the location of servers 35 making up the cloud-computing environment. The servers 35 being distributed and bounded within logical subdivisions 37 is particularly pertinent in the embodiment that fully encompass the specifics of dealing with private assets and private equity data, and pricing and structuring of derivatives instruments thereto, where provisioned access and management of certain data elements is crucial; in certain embodiments, some of the agents using the computer system (via the GUI, API, voice commands, commands by AI agents, or non-GUI non-API or another connectivity means) will be mandated by compliance or by investor agreements and terms of use to only access branched versions of the database or segregated data arrays that can only be hosted on dedicated on-premises, hybrid or cloud infrastructure Furthermore, such distributed infrastructure of the platform 31 can serve fully-provisioned derivatives creation, pricing and trading, where the data of certain private assets or private equity funds and their features, data time series and asset class-specific data elements taxonomy, particular clusters of data, or of all data pertinent to a certain private asset fund or investor or private asset underlying, is allowed only for qualified parties who have undergone a specific KYC process or are already investors or qualified recipients of the data disclosures. Possessing a combination of CPUs and GPUs, and allowing for distributed computing, hardware acceleration and parallel processing, provides the attribute of being readily scalable by adding additional machines in a on-premise, hybrid or cloud environment, to accommodate a greater number of operations, and hence derivative instruments, participating agents, and transaction volume, because in this embodiment based on archetypes for the derivatives and the pricing, the technology associated with the derivative archetype and the derivative instrument creation, management, trading and disposal, is homogenous. Thus, despite the quickly changing information that could be relevant to the creation and use of the private equity derivative instruments 30, the platform 31 is able to quickly and efficiently keep up with the computational load associated with a large number of users and produce results in a timeframe where the results remain relevant.

Further, in one embodiment, at least one of the servers 35 can serve as a supercomputer (a supercomputer being a computer that performs at or near the currently highest operational rate for computers and is typically used for applications that must handle very large databases or do a great amount of computation or both). In a further embodiment, at least one of the servers 35 is a quantum computer or a computer based on a non-binary code.

The modules implemented by the servers 35 can be implemented as a computer program or procedure written as source code in a conventional programming language and is presented for execution by the processors 39. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

In one embodiment, the present invention includes a graphical user interface. In particular embodiments, the graphical user interface of this invention can either be installed in the form of software or provided to users over the Internet through a variety of frameworks (including, but not limited to, password-protected framework, with or without multi-factor authentication, or device specific key-less or password-less unique identification based on hardware parameters or on a specific combination of unique instances of crypto primitives that are not replicable with human or machine means) that allows users to (1.) analyze in meaningful graphical and tabular form the Derivatives Archetypes, the Pricing Archetypes, the raw or derived data elements, the preferences to exposures, payoff functions or other input preferences, the derivative features, properties and parameters, the platform input and output metrics, parameters and data content, or the input and output metrics, parameters and data content of third parties such as trading platforms, (2.) via a input user sequence assign values to, or manage an upload or a technical interface mechanism to communicate to the platform pre-packaged values of, elements of the Derivatives Archetypes, the Pricing Archetypes, the derived data elements, the preferences to exposures, payoff functions or other input preferences, the derivative features, properties and parameters, the platform input and output data content, or the input and output data content for third parties such as trading platforms, (3.) provide instructions to the system to create, price, and modify, reprice or prepare for trading derivative instruments, (4.) initiate the procedure for communicating the derivative and the user preferences and choices from a set of pre-defined choices, to and from a third party such as trading platforms, (5.) track the communication logs of the user communication with the platform and with agents on the platform, as well as the track record of all transactions, preferences, metrics and others applicable to the user's commands to and interaction with the platform. In both (1.) and (2.) the user is granted the latitude to select certain risk-return-exposure preferences, payoff preferences and elements thereto, factors, indices or assets, trading terms and trading contract features and preferences, reporting metrics, and certain instrument-specific, trading contract-specific, or market participant-specific features, metrics, parameters or values.

The graphical user interface provided to the user via the user computing device 45 can include a structured collection of data including criteria for representing the user's risk-return-exposure preferences, including a functionality of updating data from a data feed, API import or structured file format import or update, a component capable of visualizing data elements from the structured collection of data, a component capable of selecting criteria from the structured collection of data, another structured collection of data including pre-defined derivatives archetypes and pricing archetypes, or templates of derivatives archetypes and pricing archetypes, and the set of minimum set of data fields and structural relationships processable with functions triggered by a programmable code that qualify a data structure as a derivatives archetype or a pricing archetype, another component capable of selecting a derivatives archetype from the set of qualified derivatives archetypes data structures, another component capable of selecting a pricing archetype from the set of qualified pricing archetype data structures, another component capable of selecting a derivative instrument from the set of qualified derivative instrument data structures, further components capable of displaying and allowing for the user input and commitment of changes to parameters for the structuring, valuation, assignment between and within data structures, for the user's risk-return-exposure preferences, the derivatives and pricing archetypes, the derivative instruments, and the potential trading parameters and trading contracts, and means for enabling transactions for the functions and procedures of system 10. Other embodiments of the user interface of this invention include an additional component capable of presenting analysis results for the user's risk-return-exposure preferences, the derivatives and pricing archetypes, the derivative instruments, and the potential trading parameters and trading contracts, and an additional component capable of presenting a number of factors, elements of derivatives archetypes or pricing archetypes, derivatives or pricing archetypes, derivative instruments and trading preferences or trading contracts. A "structured collection of data" as used herein includes, but is not limited to, lists, pull down menus containing a variety of options, dialog boxes with options, and other means for providing a number of choices. "Component" as used herein refers to means for selecting options in graphical user interfaces (GUIs) such as, but not limited to, menus, drag and drop between dialog boxes, and other selecting means.

The databases of the system 10, including the derivative data storage 17 and the databases 11, 13, and 15, provide the data for view through the user interface and for use in the method of this invention. The data can come from several sources: data elements and information arrays preset on the databases, including installation packages, deployable programmable computer code, backups and system settings, external data feeds with various data frequency where the maximum frequency is real/continuous time and where the databases allow for asynchronous updates and incremental queries and write, update or integrity check, data management and maintenance operations, data input from the GUI, data received via API, in any case after passing the applicable automated integrity and data taxonomy validation checks, other pre-programmed non-GUI non-API data delivery and synchronization methods such as AI agents, EDI, packaged runtime and query language access procedures, subject to the format and synchronization and integrity management properties matching those pre-defined from the side of the platform 31 as allowed at the time of executing the operation.

The databases of the system 10 can be relational databases. The data in one implementation of the databases can be presented in a data structure, where the data structure includes a number of data objects, stored in the memory, each data object comprising information from the database, where the data objects include a reliability class of data objects, each data object in the reliability class comprising a structured collection, with substantially reliable data, of elements of finance products, of relevant user preferences data, and of data elements that can also be utilized as factors for the purposes of the creation and management of the derivatives archetypes, the pricing archetypes or the derivative instruments, a variability class comprising a static data object and a dynamic data object, the static data object comprising static finance product, factors or platform agents' characteristics and the dynamic data object comprising variable finance product, factors or platform agents' characteristics, a derivative instrument data object comprising financial derivative instrument characteristics and a source of the financial derivative instrument characteristics, and a constructional class of data objects comprising objects that are other building blocks of the platform of different types, roles and representational density and relationships between the constructional objects.

Much care must be taken to ensure that quality control procedures are implemented to maintain the integrity of the databases as, the databases become the source of raw material organized for creation of derivatives archetypes 21, and creation of derivative instruments 30 including the functions across cash flows simulation, pricing of derivatives and formation and utilization of derivatives descriptors, derivatives restructuring and preparation for analytical and trading operations, which ultimately governs a substantial portion of the method of this invention, and also serves both as the source of raw material and as a dynamic repository and source for the information structures enabling the statistical, pricing or machine learning methods and neural networks, including logic decision trees, confidence assessments, Generalized Ridge Type estimators, ARIMA models, models with lagged variables, or other suitable techniques, including Lasso, Polynomial, Ridge (Bayesian and Kernel), Gaussian, Elastic Net, Random forest, Boosted Regression Trees, Ensemble, gradient boosting, support vector machine, support vector classification, support vector regression, among others, and other linear or non-linear including supervised or unsupervised machine learning models applicable to the embodiment. The structure of the platform 31 supports the integrity of the databases allowing to address multiple issues commonly encountered in databases, including:

i) missing data;
ii) inconsistent data within the data structures and classes; and
iii) incorrect data between frequency periods, and repetitive/coherent data structures; and
iv) data non-conforming with the data structure and the set of relational options where such data relates to information structures enabling the statistical, pricing or machine learning methods and neural networks, including logic decision trees, confidence assessments, Generalized Ridge Type estimators, ARIMA models, models with lagged variables, or other suitable techniques, including Lasso, Polynomial, Ridge (Bayesian and Kernel), Gaussian, Elastic Net, Random forest, Boosted Regression Trees, Ensemble, gradient boosting, support vector machine, support vector classification, support vector regression, among others, and other linear or non-linear incl supervised or unsupervised machine learning models applicable to the embodiment; and metadata of any file structure or data element packaged for communication within, to and from the platform 31; and file integrity and consistency, including control and management functions; and integrity and consistency of scripts and other programmable code elements triggering processed and procedures within the platform 31, and across its applicable input/output operations and communication interfaces.

Figure 2:
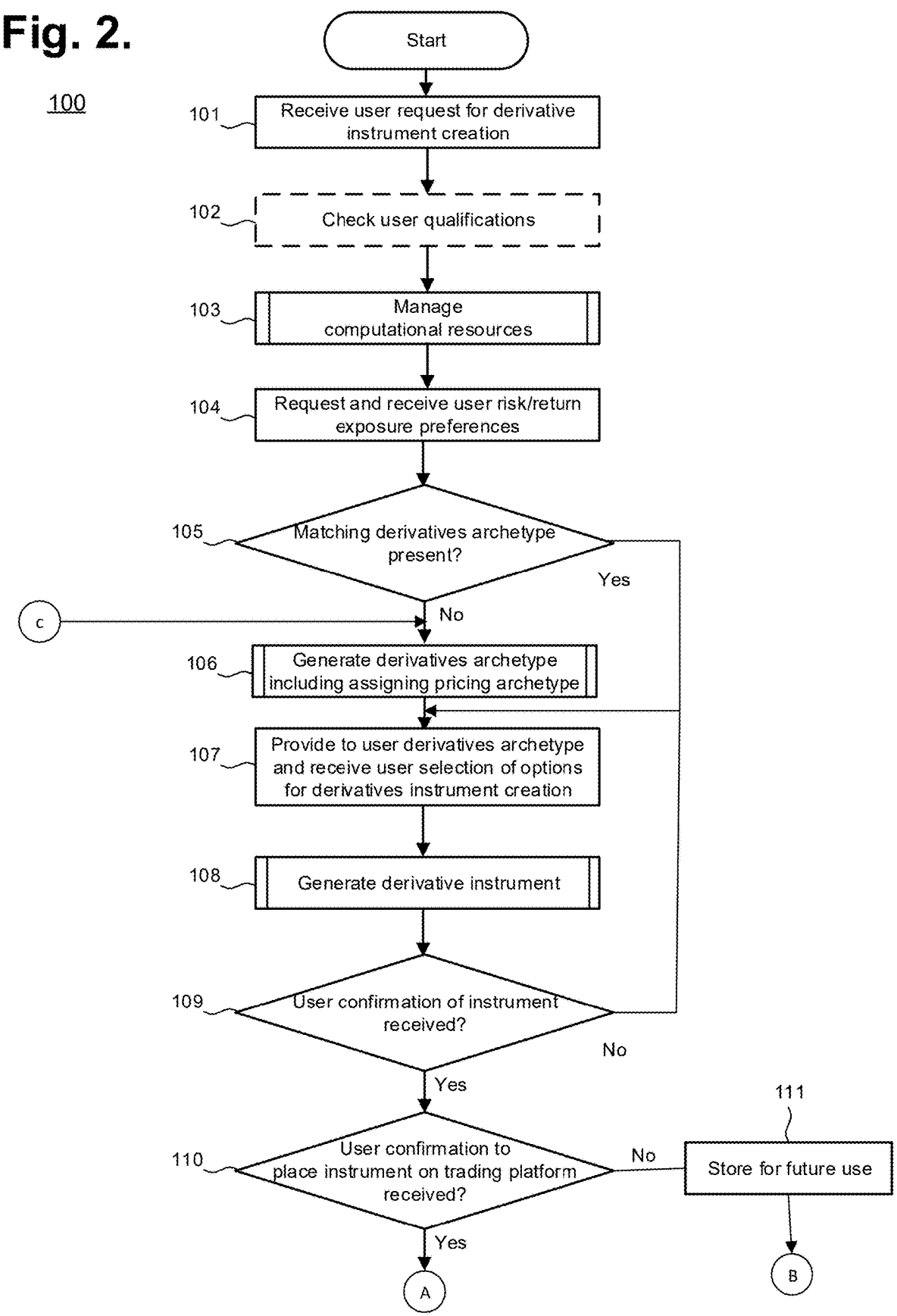
FIG. 2 is a flow diagram showing a method for private equity derivatives creation and use with the aid of a digital computer in accordance with one embodiment.
Figure 3:
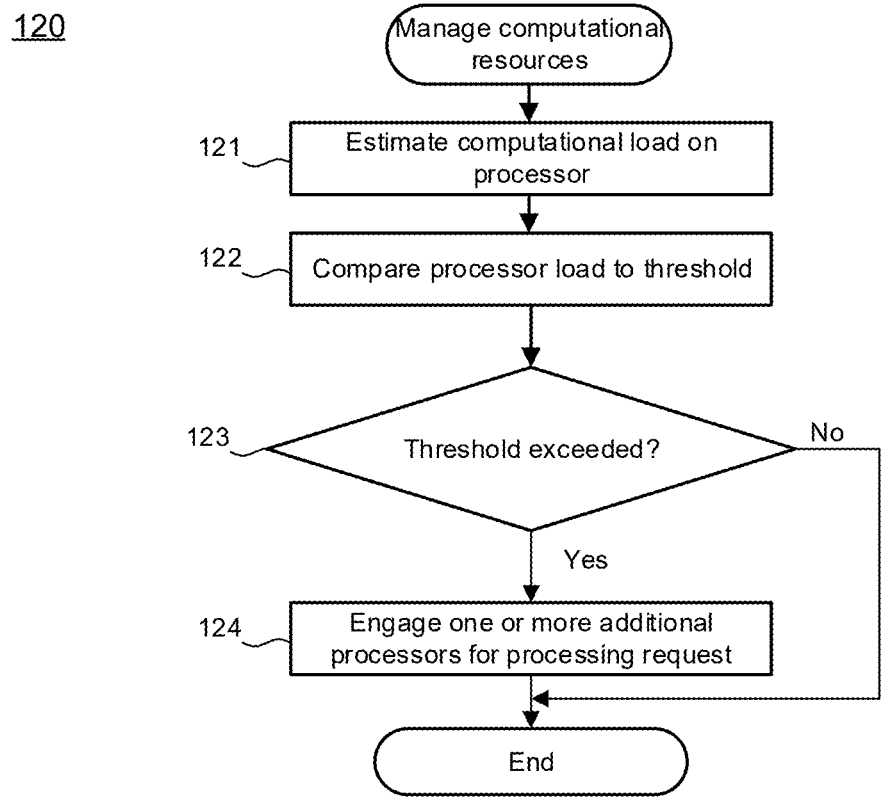
FIG. 3 is a flow diagram showing a routine for managing computational resources for use in the method of FIG. 2 in accordance with one embodiment.

The cash flow projection techniques described above address the large discontinuities in private equity asset pricing while the use of factors allows to address the lack of transparency that is conventionally seen with regards to private asset derivatives. Further, the use of flexible private asset derivatives archetypes allows decomposition of private assets to different sources of risks represented as factors and ability to gain exposure with a specific desired profile. FIG. 2 is a flow diagram showing a method 100 for private equity derivatives creation and use with the aid of a digital computer in accordance with one embodiment. The method 100 can be implemented using the system 10 of FIG. 1 described above. A user request for a creation of a derivative instrument of a private asset represented in a private asset database is received by one or more servers 35 of the platform 31 for private equity derivative creation and use (step 101). Optionally, if the private asset database is in an infrastructure that includes multiple subdivisions that require different levels of permissions, whether the user possesses the requisite qualifications (such as obtained through undergoing a KYC check) is checked by one or more of the servers 35 (step 102), with the lack of the sufficient qualifications ending the method 100 while the possession of the sufficient qualifications allowing the method 100 to proceed to step 103. The computational resources for satisfying the request are managed (step 103), as further described below with reference to FIG. 3. Risk and return preferences, described above with reference to FIG. 1, are requested by one or more of the servers 35 from the user who requested the creation of the derivative instrument and are received by one or more of the servers 35 (step 104). Whether a derivatives archetype that matches the user risk and return preferences already exists and is accessible to one or more of the servers is determined (step 105). If the matching derivatives archetype already exists and is accessible (step 105), the method 100 moves to step 107. If no matching derivatives archetype exists (step 105), one or more of the servers generate the derivative archetype, as described above and as further described below with reference to FIG. 4. The derivatives archetype is provided by one or more of the servers 35 to the computing device 45 of the user who requested the creation of the derivative instrument and receives from the user a selection of one or more options for the derivative instrument to be created, such as which of the underlyings referenced is to be used in the derivative instrument and the payoff structure of the derivative instrument (step 107). A derivative instrument is created based on the user-selected options (step 108), as further above with reference to FIG. 1 and as described below with reference to FIG. 5. The derivative instrument is provided to the user via the user's computing device and if the user confirms to one or more of the servers that the created derivative instrument is satisfactory (step 109), the method moves to step 110. If the user communicates to one or more of the servers that the created derivative instrument is not satisfactory (step 109), the method returns to step 107 where the user has the opportunity to change selected options. If the user provides instructions to one or more of the servers to list the confirmed derivative instrument on a trading platform (110), one or more of the servers provides the derivative instrument to the trading platform (112). If the user does not provide the instructions to list the application on the trading platform 41 (step 110), the derivative instrument is stored by one or more of the servers 35 for future use in the derivative data storage 17 (step 111), ending the method 100. Once listed on the trading platform, if no matching counter party is found within a predefined time (or upon receiving a user command) (step 113), the trading platform sends a message to one or more servers of the platform for private equity derivative creation and use to restructure the derivative instrument (step 114), returning the method 100 to step 106, allowing one or more of the servers of the of the platform for private equity derivative creation and use to create a new derivative archetype that will reflect the interests of the counterparties present on the trading platform. If a matching counter party for the derivative instrument is found within a predefined time (step 113), a trade is executed for the derivative instrument by the trading platform upon receiving a confirmation from the user (step 115). Optionally, one or more of the servers 35 of the platform 31 for private equity derivative creation and use performs analysis of the trade, such as aggregating the data regarding the trade with data regarding other trades and detecting patterns in the aggregate data (though other kinds of analysis are also possible (step 116), ending the method 100. The flexible management of computation resources of the platform for private equity derivative creation and use allows to handle computational loads of a multitude of high complexity requests. FIG. 3 is a flow diagram showing a routine 120 for managing computational resources for use in the method 100 of FIG. 2 in accordance with one embodiment. The routine 100 can be executed by a processor of a server 35 of the platform 31 for private equity derivative creation and use acting as a taskmaster for that platform. Initially, a computational load associated with processing the user's request on a CPU of one of the servers of the platform 31 for private equity derivative creation and use that is assigned to process that request is estimated (step 121). The estimated load is compared to a threshold (step 122). If the estimated load exceeds the threshold (step 123), the taskmaster CPU commands one or more processors 39 (such as GPU processors) in one or more servers 35 of the platform 31 for private equity derivative creation and use to participate in processing the request (thus engaging in parallel processing with the CPU initially assigned the request), thus ending the routine 120. In the embodiment, where the CPU initially assigned the request is an on-premises infrastructure and the combined available processors in the on-premises infrastructure lack the computational power to process the request within a predefined time, the taskmaster CPU can engage one or more processors in servers in a cloud-computing environment for processing the request, thus creating a hybrid infrastructure.

Figure 4:
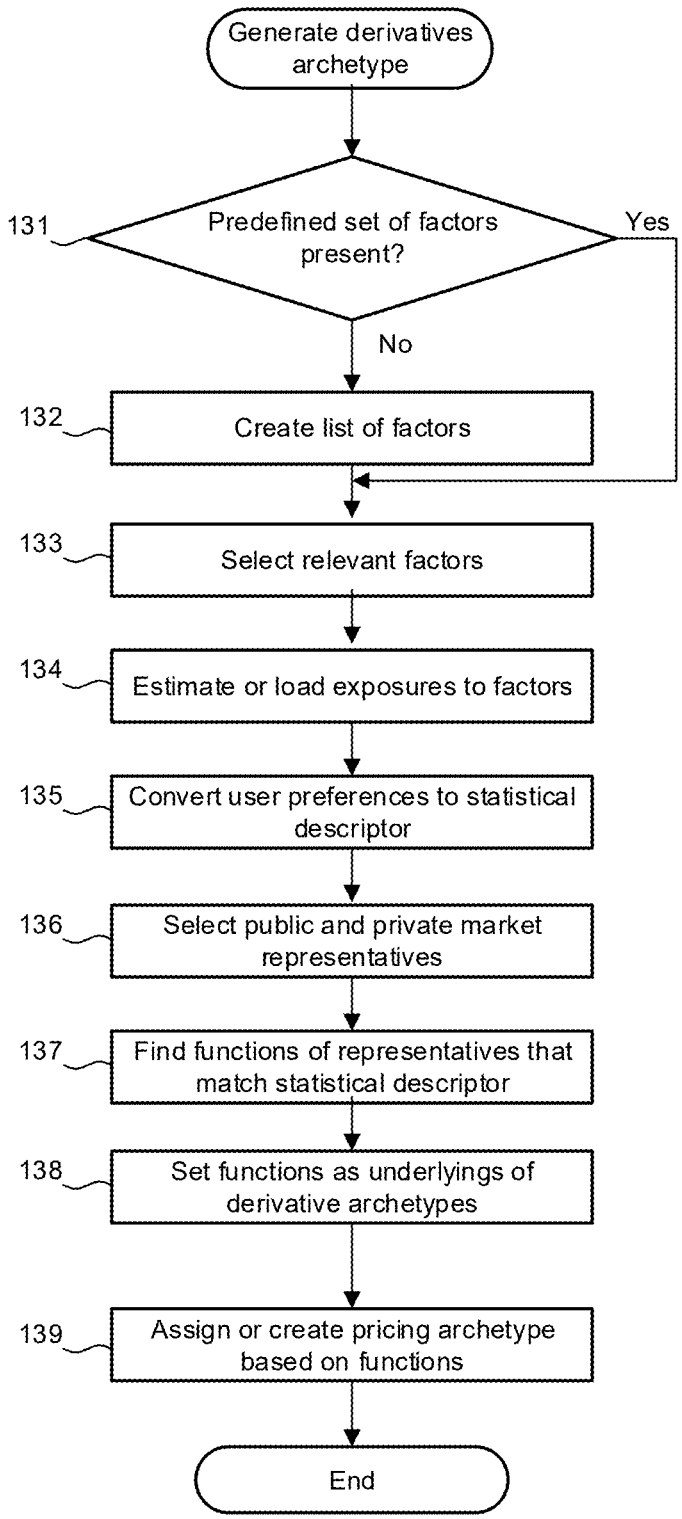
FIG. 4 is a flow diagram showing a routine for creation of a derivative archetype for use in the method of FIG. 2 in accordance with one embodiment.
Figure 5:
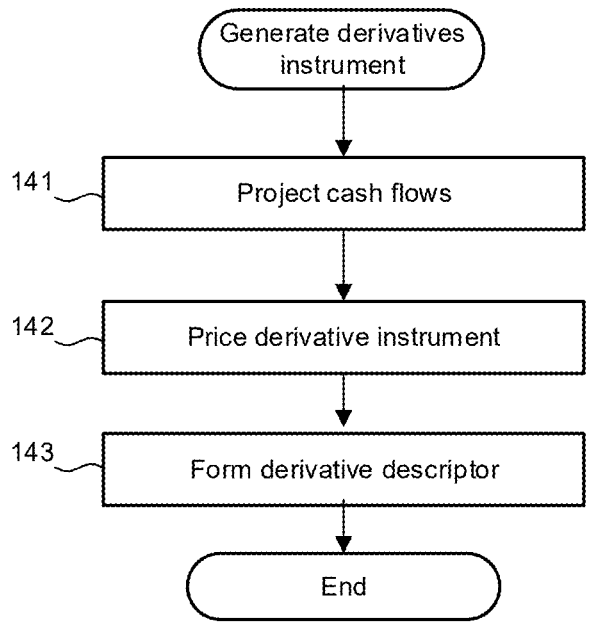
FIG. 5 is a flow diagram showing a routine for creation of a derivative instrument for use in the method of FIG. 2 in accordance with one embodiment.

The derivatives archetype provides a computationally-efficient way to locate all machine-readable information necessary for a creation of a derivative instrument. FIG. 4 is a flow diagram showing a routine 130 for creation of a derivative archetype for use in the method 100 of FIG. 2 in accordance with one embodiment. Whether a preexisting list of factors associated at least some of the private assets stored in the private asset database associated with the user request is stored in the derivative data storage is determined by one or more of the servers 35 (step 131). If there is a preexisting list of factors (step 131), the routine 130 moves to step 133. If there is no preexisting list of factors (step 131), the list of factors is created as described above with reference to FIG. 1 by one or more of the servers 35 (step 132). Factors relevant to the user risk and return preferences are determined as described above with reference to FIG. 1 by one or more servers 35 (step 133). Exposures of the private assets and public assets represented in the private asset database and public asset database are estimated as described above with reference to FIG. 1 by one or more of the servers 35 (step 134). Alternatively, if the exposures have been previously estimated and stored in the derivative data storage, the exposures could be loaded by one or more of the servers 35. User risk and return preferences are converted to a statistical descriptor as described above with reference to FIG. 1 by one or more of the servers 35 (step 135). Public market representatives and private asset representatives are selected by one or more servers 35 as described above with reference to FIG. 1 (step 136). Functions of the private market representatives and public market representatives are found as described above with reference to FIG. 1 (step 137) by one or more of the servers 35 and are set as the underlyings of the derivative archetype being created by one or more of the servers 35 (step 138). Based on the functions and the pay-off structure, one or more of the pricing archetypes is assigned to the derivative archetype (step 139), thus finishing creating of the derivative archetype and ending the routine 130. Alternatively, if no preexisting pricing archetype matches the formulas, a new pricing archetype is created (step 139) for the derivative instrument, thus finishing creation of the derivative archetype and ending the routine 130. Projecting a cash flow associated with the underlying of the derivative instrument is essential for creation of that instrument. FIG. 5 is a flow diagram showing a routine 140 for creation of a derivative instrument for use in the method 100 of FIG. 2 in accordance with one embodiment. Cash flows associated with the underlying of the derivative instrument are determined by one or more of the servers 35 as described above with reference to FIG. 1 (step 141). Price of the derivative instrument is determined using the pricing archetype assigned to derivatives archetype associated with that derivative instrument and using the estimated cash flows by one or more of the servers 35 (step 142). The descriptor of the derivative instrument is created by one or more of the servers 35, thus finishing the creation of the derivative instrument (step 143), ending the routine 140.

While the invention has been particularly shown and described as referenced to the embodiments thereof, those skilled in the art will understand that the foregoing and other changes in form and detail may be made therein without departing from the spirit and scope.

What is claimed is:

1. A system for private equity derivatives creation and use with the aid of a digital computer, comprising:
   a cloud-computing environment comprising:
      a plurality of logical subdivisions, each of the logical subdivisions associated with users with qualifications different from the qualifications of users associated with the remaining logical subdivisions, each of the logical subdivisions comprising one or more databases storing digital identities of items comprising a plurality of representations of private equity assets, a plurality of representations of public equity assets, and pricing archetypes, each digital identity comprising at least two data arrays and metadata comprising a connection between at least two of the arrays and machine-readable instructions for processing that digital identity, the plurality of databases further storing derivatives archetypes, each of the derivatives archetypes comprising machine-readable references to locations of items comprising the digital identity for a derivative instrument associated with that derivatives archetype and the digital identity for one or more underlyings of the derivative instrument;
      one or more servers comprising a plurality of processors comprising one or more central processing units (CPUs) and one or more graphics processing units (GPUs), the processors interfaced to plurality of databases and configured to perform using at least some of the digital identities steps of:
         receive from one of the users a request to create a derivative instrument of one of the private equity assets represented in one of the databases in one of the logical subdivisions;
         determine whether the one user possesses the qualifications for accessing the one database in the one logical subdivision;
         after determining that the one user possesses the qualifications for accessing the one database in the one logical subdivision, receive from the one user preferences for risk, return and exposure;
         check whether one of the stored derivatives archetypes satisfies the received preferences;
         upon none of the stored derivatives archetypes satisfying the preferences, create the new derivatives archetype associated with the private asset derivative instrument based on the preferences, comprising associating one or more of the pricing archetypes with that new derivatives archetypes based on the user preferences;
         receiving from the one user settings for the private asset derivative instrument associated with the new derivatives archetype and one or more desired characteristics for the private asset derivative instrument;
         create the private asset derivative instrument using a portion of the new derivatives archetype, the pricing archetype associated with the new derivative archetype, the private asset derivative instrument user settings, and the one or more desired characteristics; and
         use the private asset derivative instrument for private equity asset portfolio management.

2. A system according to claim 1, at least some of the processors further configured to:
   create a list of factors associated with the representations of the private assets comprising applying machine-implemented quantitative model over the plurality of representations of private assets over a set of the representations of the public assets set as public market representatives;
   identify those of the factors on the list relevant to the user preferences;
   identify exposures of the private assets and the public assets;
   convert the user preferences to a statistical descriptor using the identified factors and the exposures;
   select one or more of the representations of the private assets as private market representatives;
   use the public market representatives, the private market representatives, and the statistical descriptor to find functions associated with the private market representatives and the public market representatives that match the statistical descriptor;
   set the functions of the public market representatives and of the private market representatives as underlyings of the new derivatives archetype;
   project cash flows of the public market representatives and the private market representatives comprised in the new derivatives archetype; and
   price the private asset derivative using the one or more pricing archetypes associated with the new derivatives archetype and using the projected cash flows.

3. A system according to claim 2, wherein the factors are at least one of categorical factors based on descriptive characteristics of the representations of the private assets, and factors representing sensitivity to at least one of one or more macro-regimes and market-regimes.

4. A system according to claim 3, wherein the machine-implemented quantitative model comprises a regression model comprising one or more of a panel regression model and a cross-sectional regression model.

5. A system according to claim 3, wherein the machine-implemented quantitative model comprises one or more machine-learning quantitative model comprising one or more of Lasso model, Polynomial model, Ridge model, Gaussian model, Elastic Net model, Support Vector model, Decision tree-based model, and Genetic algorithm model.

6. A system according to claim 5, wherein the identifying of the factors on the list relevant to the user preferences comprises applying an optimization that minimizes number of features to decrease complexity.

7. A system according to claim 2, wherein the machine-implemented quantitative model works with factors that represent one or more of one or more market indices, one or more public market proxies, one or more macro-factors, and derived market data.

8. A system according to claim 2, wherein the identifying of the factors on the list relevant to the user preferences comprises applying predetermined matching criteria to the list of factors and the user preferences.

9. A system according to claim 2, wherein the identifying of the factors on the list relevant to the user preferences comprises solving an optimization problem.

10. A system according to claim 2, wherein identifying the exposures comprises applying a regression model or Machine-learning model on desired characteristics of the private assets towards a desired set of variables.

11. A system according to claim 2, wherein converting the user preferences to a statistical descriptor using the identified factors and the exposures comprises constructing an empirical distribution of the exposures towards each of the factors.

12. A system according to claim 2, wherein finding functions associated with the private market representatives and the public market representatives that match the statistical descriptor comprises dividing the exposures associated with the private market representatives and the public market representatives into quantiles for each of the identified factors and selecting those of the exposures that are in the highest, lowest, and middle quantiles for each of the factors.

13. A system according to claim 2, wherein finding functions associated with the private market representatives and the public market representatives that match the statistical descriptor comprises solving an optimization problem subject to constraints to mimic the statistical descriptor.

14. A system according to claim 2, wherein projecting the cash flows comprises one or more of:
  representing historically observed cash flows of the private market representatives comprised in the new derivatives archetype;
  using a deterministic approach that estimates parameters based on historically observed cash flows of the private market representatives;
  using stochastic model based on Brownian motion; and
  using a stochastic model based on Levy processes.

15. A system according to claim 2, wherein the private asset derivative is sent to a trading platform which lists the private asset derivative instrument on an order book, at least some of the processors further configured to perform one of:
  executes a trade upon matching characteristics of the private asset derivative instrument with interest of a counter party;
  upon failing to match the characteristics, direct one or more of the processors to restructure the private asset derivative instrument based on the interests of the counter parties.

16. A system according to claim 1, wherein one of the CPUs is configured to perform parallel processing with one or more of the GPUs.

17. A system according to claim 16, wherein one of the CPUs is a taskmaster and is further configured to:
  determine a computational load of one or more of the steps to be performed by one or more of the CPUs;
  determine whether the one or more CPUs can complete the one or more steps within a predefined time by comparing the computational load to a threshold;
  upon the computational load exceeding the threshold for one or more of the steps on one or more of the CPUs, assign one or more of the GPUs to perform the parallel processing for the one or more steps together with the one or more CPUs on which the load exceeds the threshold.

18. A hybrid system for private equity derivatives creation and use with the aid of a digital computer, comprising:
  a plurality of databases storing digital identities of items comprising a plurality of representations of private equity assets, a plurality of representations of public equity assets, and pricing archetypes, each digital identity comprising at least two data arrays and metadata comprising a connection between at least two of the arrays and machine-readable instructions for processing that digital identity, the plurality of databases further storing derivatives archetypes, each of the derivatives archetypes comprising machine-readable references to locations of items comprising: the digital identity for a derivative instrument associated with that derivatives archetype and the digital identity for one or more underlyings of the derivative instrument;
  a plurality of processors comprising one or more central processing units (CPUs) that are in a same premises and one or more graphics processing units that are in a cloud-computing environment, wherein one of the CPUs is a taskmaster, the processors interfaced to plurality of databases, wherein:
    one of the CPUs is configured to receive from a user a request to create a derivative instrument of one of the private equity asset represented in one of the databases, wherein one of the CPUs is assigned to process the request;
    the taskmaster CPU is configured to determine a computational load for processing the request by the assigned CPU and determine whether the assigned CPU can complete the processing of the request within a predefined time by comparing the estimated load to a threshold, and upon determining that the assigned CPU is unable to perform the processing of the request within a predefined time, assign one or more of the GPUs to perform parallel processing with the assigned CPU over an Internetwork to process the received request, the processing of the request further comprising:
      receive from the user preferences for risk, return and exposure;
      check whether one of the stored derivatives archetypes satisfies the received preferences;
      upon none of the stored derivatives archetypes satisfying the preferences, create the new derivatives archetype associated with the private asset derivative instrument based on the preferences, comprising associating one or more of the pricing archetypes with that new derivatives archetypes based on the user preferences;

receiving from the user settings for the private asset derivative instrument associated with the new derivatives archetype and one or more desired characteristics for the private asset derivative instrument;

create the private asset derivative instrument using a portion of the new derivatives archetype, the pricing archetype associated with the new derivative archetype, the private asset derivative instrument user settings, and the one or more desired characteristics; and use the private asset derivative instrument for private equity asset portfolio management.

* * * * *